H. C. WALTER.
SYSTEM OF ELECTRIC MOTOR CONTROL.
APPLICATION FILED MAY 27, 1912.

1,175,322.

Patented Mar. 14, 1916.

WITNESSES:
Fred H. Miller
R. J. Dearborn

INVENTOR
Henry C. Walter
BY
Wiley E. Carr
ATTORNEY

ORIGINAL

UNITED STATES PATENT OFFICE.

HENRY C. WALTER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,175,322.  Specification of Letters Patent.  Patented Mar. 14, 1916.

Application filed May 27, 1912. Serial No. 700,034.

*To all whom it may concern:*

Be it known that I, HENRY C. WALTER, a citizen of the United States, and a resident of Pittsburgh, in the county of Allegheny and State of Pennsylvania, have invented a new and useful Improvement in Systems of Electric-Motor Control, of which the following is a specification.

My invention relates to methods of and systems for controlling electric motors and it has special reference to the control of local or regenerative braking circuits for direct current motors.

One object of my invention is to provide, in a controller of the class above indicated, automatic means, dependent upon the speed of the motor, for regulating the flow of current in a regenerative braking circuit.

Another object of my invention is to provide a simple method for automatically governing the braking of electric motors.

Controllers for electric motors have heretofore been arranged to establish a local regenerative braking circuit in which the electric energy generated in the motor armature during the braking period is consumed. The degree of braking secured in this manner has been directly dependent upon the speed of the motor armature and inversely dependent upon the resistance included in the braking circuit. When the motor operated at high speeds, considerable resistance was therefore inserted in the braking circuit and some means was provided for either manually or automatically reducing the resistance as the speed of the motor decreased, in order to maintain a substantially constant braking force.

According to my present invention, I provide a braking circuit which is so connected to the motor armature as to receive alternating current energy, and I introduce such a reactance, or combination of reactance and resistance, as to automatically effect the desired braking, irrespective of the motor speed when the braking circuit is completed and during the entire braking period.

My invention relies upon the fact that the value and effectiveness of reactance depends upon the frequency of the alternating current in the circuit with which it is associated.

Figure 1:
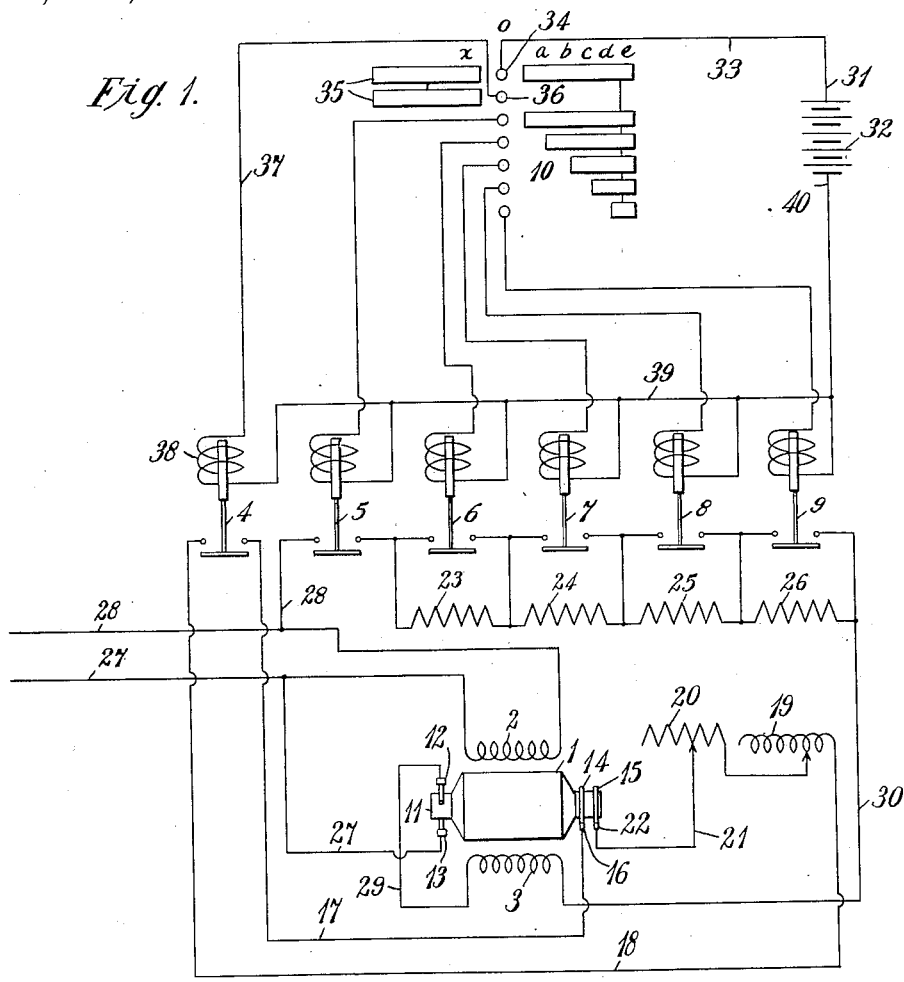
Figure 2:
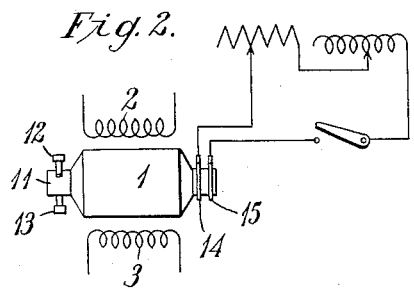
Figure 3:
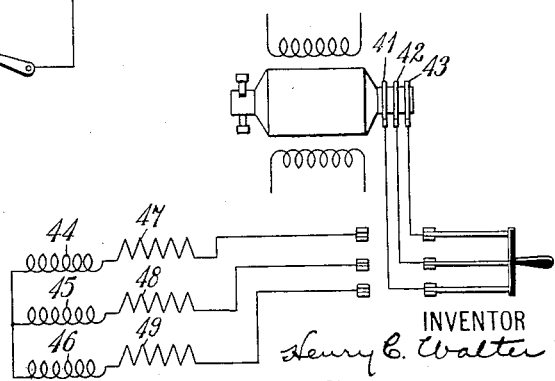

Figure 1 of the accompanying drawings is a diagrammatic view of a system of control embodying and adapted for practicising my invention. Fig. 2 is a simple diagram showing only the regenerative braking circuit connections. Fig. 3 is a view, corresponding to Fig. 2, of a modified arrangement which also embodies my invention.

Referring to Figs. 1 and 2 of the drawings, a direct current electric motor having an armature 1, and field magnet windings 2 and 3 is governed by a plurality of independently operated switches 4 to 9, inclusive, which, in turn, are controlled by a master switch 10. The master switch is adapted to occupy a plurality of motor-operating positions *a*, *b*, *c*, *d* and *e*, a single braking position *x* and an off position *o*. In addition to the usual commutator cylinder 11 and its brushes 12 and 13, the armature 1 is provided with a pair of collector rings 14 and 15 which are connected to suitable points in the armature winding. When the switch 4 is closed, a circuit is completed from a brush 16, which engages the ring 14, through a conductor 17, the switch 4, a conductor 18, an adjustable reactance member 19, and adjustable resistance member 20 and a conductor 21 to a brush 22 which engages the ring 15. In starting the motor, resistor sections 23, 24, 25 and 26 are included in circuit with the motor armature in the usual manner, and they are successively short circuited as the switches 6 to 9, inclusive are closed.

The operation of the system is as follows: Assuming that the switches occupy the positions indicated in the drawing, if the master switch 10 is moved into position *a*, a circuit is established from a line conductor 27, through shunt field magnet winding 2 to an opposite line conductor 28. An armature circuit is established from the conductor 27, through the commutator brush 13, the armature winding, the commutator brush 12, the conductor 29, the series field magnet winding 3, a conductor 30, the resistor sections 26 to 23, inclusive, and the switch 5—which is closed in this position of the master switch—to the line conductor 28. As the master switch successively occupies positions *b*, *c*, *d* and *e*, switches 6, 7, 8 and 9 are successively closed and the resistor sections 23, 24, 25 and 26 are successively short circuited, leaving the motor armature and the series field magnet winding connected across the circuit. In order to stop the motor regardless of its speed of operation, it is only necessary to return the master controller to the off position *o* and move it into the braking position *x*. In this position, a control circuit is established from a terminal 31 of a storage battery 32, or from some other suitable source of energy, through a conductor 33, a contact finger 34, contact segments 35, a contact finger 36, a conductor 37, a coil 38 of the switch 4 and a conductor 39 to an opposite terminal 40 of the battery. When coil 38 is energized, switch 4 is closed and the braking circuit is established, as above indicated. The intensity of the braking action will, of course, be dependent upon the current, which traverses the braking circuit and the armature winding, and is determined by the speed of the motor and the active portions of the resistance member 20 and the reactance member 19. The value of the reactance will automatically vary with the speed of the motor, since the reactance is always dependent upon the frequency of the alternating current which is supplied to the reactance member. Any desired retardation of the motor may therefore be secured by properly proportioning and adjusting the resistance member 20 and the reactance member 19. This is evident from a consideration of the fact that if the motor armature is rotating at relatively high speeds when the braking circuit is established, the value of the reactance will be great, whereas its value will be relatively small if the armature speed is low. Consequently, during the braking period, the effect of the reactance of the member 19 is to prevent an excessive current traversing the braking circuit when the motor is operating at high speeds and its counter electromotive force is high and, at the same time, to permit a sufficient braking current to secure the desired braking action when the speed and counter-electromotive force of the motor have been materially reduced.

Referring to Fig. 3 of the drawings, according to the arrangement here shown three collector rings 41, 42 and 43 are substituted for the rings 14 and 15 and a star-connected three-phase braking circuit is substituted for the single phase braking circuit of Fig. 1. With the three-phase arrangement, three reactance members 44, 45 and 46 and three resistance members 47, 48 and 49 are utilized, one reactance member and one resistance member being located in each branch of the three-phase circuit. I believe the braking effect will be somewhat enhanced by utilizing the three-phase arrangement, but the single-phase arrangement is, of course, simpler and is almost equally effective.

That portion of the controller which has to do with the acceleration of the motor forms no part of my present invention and may be replaced by any suitable manually operated or automatic controller. It is also evident that the circuit connections of the system may be modified within the spirit and scope of my invention.

My invention is not restricted to a compound wound motor, but is applicable to various types of dynamo electric machines.

I claim as my invention:

1. The method of braking a direct-current motor which consists in establishing a local alternating-current circuit comprising the motor armature and opposing the flow of current in said circuit by an external reactive impedance.

2. The method of braking a direct-current electric motor which consists in establishing a local alternating-current circuit including the motor armature and opposing the flow of current in said circuit by a predetermined combination of resistance and reactance.

3. The method of braking a direct-current electric motor which consists in establishing a local alternating-current circuit comprising the motor armature and opposing the flow of current in said circuit in accordance with the speed of said motor.

4. A braking system comprising a direct-current electric motor having an armature winding, an external reactive impedance and means for completing an alternating-current local circuit including the armature winding and the impedance.

5. A braking system comprising an electric motor having an armature winding, collector rings connected to suitable points therein, brushes engaging the rings, an external reactive impedance, and means for connecting the impedance across the collector rings during the braking period.

6. A braking system comprising a direct current electric motor having an armature winding and a commutator cylinder, means for including resistance in the armature circuit and excluding the same therefrom, collector rings connected to suitable points in the armature winding, an external reactive impedance, and a braking switch for connecting the external impedance across the collector rings during the braking period.

7. A braking system comprising a direct-current electric motor having an armature winding, of means for establishing a local alternating-current circuit including said winding and means for opposing the flow of current in said circuit in accordance with the speed of said motor.

In testimony whereof, I have hereunto subscribed my name this 24th day of May 1912.

HENRY C. WALTER.

Witnesses:
F. A. REW,
B. B. HINES.